Figure 1:
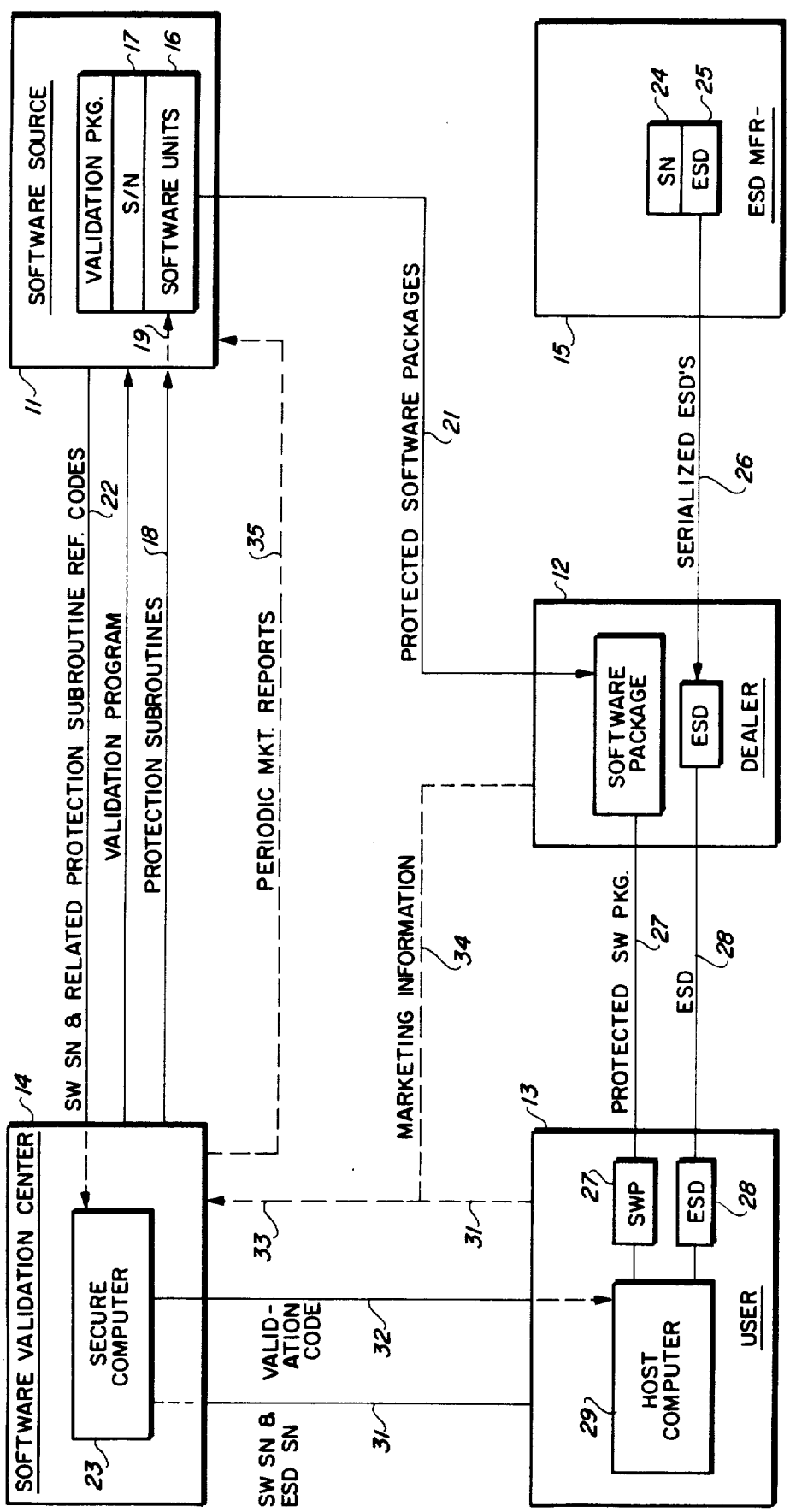

United States Patent [19]

Thomas

[11] Patent Number: 4,685,055
[45] Date of Patent: Aug. 4, 1987

[54] METHOD AND SYSTEM FOR CONTROLLING USE OF PROTECTED SOFTWARE

[76] Inventor: Richard B. Thomas, 1902 E. Hope St., Mesa, Ariz. 85203

[21] Appl. No.: 750,287

[22] Filed: Jul. 1, 1985

[51] Int. Cl.⁴ .............................................. G06F 9/00
[52] U.S. Cl. ................................ 364/200; 340/825.31
[58] Field of Search ................ 364/300, 200 MS File, 364/900 MS File; 178/22.08, 22.09

[56] References Cited

U.S. PATENT DOCUMENTS 4,446,519  5/1984  Thomas .............................. 364/300

Primary Examiner—Raulfe B. Zache
Attorney, Agent, or Firm—William H. Drummond

[57] ABSTRACT

A protection subroutine with a unique reference code is emplaced in a protected software package. The package also contains a validation program. The protection subroutine and validation program connect with an ESD and both the ESD and the program communicate with a secure computer. Upon receipt of inputs of the software serial number and reference code and the ESD identifier, the computer generates a validation code which causes the protection subroutine to command execution of the protected software by its hose computer.

1 Claim, 1 Drawing Figure

METHOD AND SYSTEM FOR CONTROLLING USE OF PROTECTED SOFTWARE

This invention is an improvement upon the methods and apparatus for providing security software disclosed in commonly owned U.S. Pat. No. 4,446,519 issued May 1, 1984.

This invention pertains to methods and systems for protecting computer software from unauthorized copying.

In yet another respect, the invention relates to methods and systems for preventing unauthorized copying of computer software in a more effective, less expensive manner.

In still another respect the invention pertains to systems and methods in which software is validated by a central validating facility at the time of initial usage by the customer.

In yet another and more particular respect, the invention includes systems and methods for facilitating the distribution of computer software from a software source, through multiple dealers to the dealers' customers.

In still another and more particular aspect, the invention includes mehtods and systems for the secure transmission of computer software directly from the software source to the end-user's authorized hardware, with or without intermediate parties (distributors, dealers, marketing agents, etc.) in the chain of distribution of the software from the source to the end-user.

In another important respect, the invention relates to methods and systems for controlling the use of computer software which is leased to the end-user.

In still another important and particular respect, the invention concerns methods and systems which enable multiple end-users to obtain validation on multiple software packages without the necessity of each end-user having more than one electronic security device.

In still another, further and important respect, the invention provides methods and systems for controlling the use of protected computer software which enables one or more validation centers to authorize the use of multiple programs from multiple sources by multiple end-users for the purposes of policing unauthorized use, calculating, billing and collecting usage fees or royalties thereon and other similar control, reporting and accounting purposes. Thus, the invention provides methods and systems for authorizing computer software which enables a single software manufacturer to centrally authorize the use of its own software, and thereby collect and maintain the confidentiality of its own marketing information and other data for billing and accounting purposes.

According to yet another aspect of the invention, methods and systems are provided which enable software sources to accumulate valuable distributor-related and/or user-related marketing data. Thus, the information given to the software validation center by the users at the time they request software validation is collected by the control center and distributed to the respective software manufacturers. This information is the basis for valuable market reports. These reports would give such information as: how much of their software was sold; who bought it; how much they paid for it; who sold it to them; etc. Such market data could not be obtained in any other way except through a central validation center where such information is necessarily obtained in the validation procedure.

Various methods and systems have recently been proposed for providing security for computer software. Due to legal uncertainties as to the effectiveness of protection currently available to protect against unauthorized use, duplication of computer software and the practical problems of detection and proof of such unauthorized use, the originators of computer software and legitimate sellers and possessors of computer software as well as industry-sponsored groups, trade associations and the like have expended considerable effort in attempts to provide extra-legal means to prevent such unauthorized use.

For example, such efforts have included such simple expedients as building codes into the software which prevent duplication of the software or which require the user to perform prearranged, manipulative steps as the condition precedent to execution of the software by the user's hardware. However, such simple expedients have not proved particularly effective as sophisticated software pirates have demonstrated the ability to break down these security methods both for the purpose of making unauthorized copies of the software and for effecting execution of the software by unauthorized means.

Similarly, efforts by software manufacturers or other legitimate sources to commercially exploit valuable proprietary software by means other than outright sales to the end-users, for example, by leasing software with the lease payments to be dependant on the extent of use, have been hampered by the practical inability to monitor and/or verify the extent of use by the lessee. Also, where such verification is possible in respect of the use of a particular authorized copy of the software, it has been difficult to prevent the lessee from making additional unauthorized copies, the royalty-generating use of which is practically impossible to detect.

The entire problem of protecting against unauthorized use or copying and otherwise controlling the use of computer software, once it has been transmitted to or otherwise made available to the end-user, is exacerbated by the desire and need for end-users to make and maintain "back-up" copies of the software for use in the event of a malfunction of the user's computer system which destroys or damages the originally transmitted or delivered software.

According to more sophisticated techniques developed in the art, so-called "electronic security devices" have been proposed and developed. These ESDs generally consist of hardware or hardware/software packages which are furnished to a legitimate possessor of computer software and which provide identification/authorization handshakes between the user's hardware and the software desired to be protected. For example, methods and apparatus involving such techniques are disclosed in the commonly owned U.S. Pat. No. 4,446,519 issued May 1, 1984 entitled "Methods and Apparatus for Providing Security for Computer Software".

While systems and apparatus which involve use of an ESD have proven effective in many instances to provide security for or control the use of computer software, these prior art systems and methods do suffer the disadvantage that the ESD is product-specific or, at least, source-specific, i.e., a potential user of a large number of programs from a single source or a customer which has the requirement of multiple programs from multiple sources must procure a plurality of ESDs, each for use with a specific software package or with multiple packages from the same source. According to prior art techniques, the security value of the ESD would be practically destroyed if the ESD was configured so as to authorize the execution of software packages obtained by a legitimate purchaser from multiple sources.

Another problem which is not addressed or resolved by current state-of-the-art software security systems is that of providing for direct (e.g., electronic) transmission of computer software from the source to the user's hardware. As will be immediately appreciated by those skilled in the art, the requirement of a program-specific or source-specific ESD in the possession of the end-user would largely defeat the economies and security-related conditions which are otherwise served by such direct transmission.

Finally, it is often highly desirable that the originator or other legitimate source of computer software packages obtain accurate information in the nature of marketing statistics reflecting the geographical and/or numerical extent of sales of the packages as well as customer-related information, e.g., size, type of business, extent of use, etc. Heretofore, the compilation and transmission of such marketing statistics have been complicated by the presence of other persons and firms in the legitimate chain of distribution of the products who may or may not diligently compile and transmit this information to the software source in an accurate or timely fashion.

Accordingly, it would be highly desirable to provide methods and apparatus for controlling the use of protected computer software so as to prevent unauthorized copying and/or execution of the software by unauthorized means. It would also be highly desirable to provide improved systems and methods for protecting and controlling the use of computer software which facilitate distribution of the software from its source, through multiple dealers to the end-use customer. Further, it would be highly advantageous to provide computer software protection systems which are compatible with the secure transmission of the software directly from the source to the end-user's authorized hardware by direct means which did not involve the intermediate parties in the chain of marketing of the software. Additionally, it would be highly desirable to provide methods and systems for controlling the use of protected computer software which would enable one or more central validation centers to monitor the use of multiple programs from multiple sources by multiple end-users for the purposes of policing unauthorized use and for calculating billing and collecting usage fees or royalties thereon or for other similar control, reporting and accounting purposes. Finally, it would be highly advantageous to provide improved methods for controlling the use of protected computer software which enable the software source to directly obtain valuable marketing statistics by direct and automatic transmission from the end-user of the software or from others in the chain of distribution.

The foregoing advantages are realized according to methods and systems which I have invented which permit a single authorized end-user of protected computer software to obtain directly (or indirectly through intervening dealers) the protected software package and necessary authorization or validation thereof for authorized hardware without the necessity of obtaining and using a plurality of ESDs which are program-specific and/or source-specific.

Briefly, in accordance with my invention I provide a central control system for protecting computer software which includes a protected software package, an ESD, a secure computer and communication means for transmitting a validation code from the computer to the software package.

The protected software package includes a software unit having an ascertainable serial number and a protection subroutine having a unique reference code. The protection subroutine includes means for establishing communication with an ESD, means for generating ESD interrogation signals and means for causing the completion of the execution of the protected software by a host computer in communication with the ESD if, but only if, the protected subroutine recognizes an identifier signal generated by the ESD. The protected software package also includes a validation program which communicates the validation code to the ESD.

The ESD includes means for generating identifier signals in response to the interrogation signals generated by the protection subroutine.

The secure computer has a working memory which contains the software serial number and the corresponding unique reference code of the protected software package and also includes means for generating the validation code in response to inputs of this serial number and the ESD identifier.

As used herein, the following terms have the meanings indicated below:

"Protected Software Package" means a software unit with a related protection subroutine.

"Validation Code" means a scrambled or encrypted identifier code containing at least:
(a) a random number,
(b) the serial number of the intended ESD,
(c) the serial number of the software package to be validated in the intended ESD.

This code is generated by the secure computer of the SVC at the time the user requests his validation code during the validation process.

"Validation Program" means a separate software package shipped on the same or related disk with the ability of connecting the validation code received from SVC to the ESD via the host computer.

"Secure Computer" means a hardware/software combination used exclusively by a central control center for the purpose of providing validation codes.

"Protection Subroutine" means software or programs which may be included in protected software or separate therefrom which is configured and used for the following purposes:
(a) communicates with the ESD,
(b) generates identifier signals for transmission to the ESD,
(c) receives identifier codes from the ESD,
(d) based on (b) and (c) above, determines whether or not the protected software package will be allowed to run.

Various means, including the presently preferred embodiments thereof, for achieving these defined functions are described below.

The method and system of the invention will be best understood by those skilled in the art by reference to the accompanying drawing, in which:

FIG. 1 is a flow chart illustrating a system embodying the invention in which the protected software is delivered from the software source to the customer by means of transportable physical media through an intervening entity (dealer) in the chain of distribution.

It will be understood that the drawing and accompanying description thereof is intended to assist those skilled in the art in understanding the invention and for depicting presently preferred embodiments thereof. As such, the drawing and accompanying description are illustrative and are not included for purposes of limitation on the scope of the invention which is defined only by the appended claims.

Turning now to the drawing, FIG. 1 depicts a typical chain of distribution of protected software from a software source 11 through a dealer 12 to the end-user 13. According to one presently preferred embodiment of the invention, a software validation center 14 is provided which furnishes validation services to one or more software customers 13. Also, FIG. 1 depicts, as a separate entity, an ESD manufacturer 15.

In the system of FIG. 1, the software source 11 generates a plurality of software units 16, each of which is assigned a characteristic, unique serial number 17. The software validation center 14 generates a plurality of protection subroutines 18, a specific one of which 19 is mated by the software source 11 with a particular software unit 16 and serial number 17 to form a protected software package 21. The SVD also generates a general validation program to be shipped with the protected software package and to be used to validate the ESD for that software package.

The software source 11 transmits information 22 to the validation center 14 consisting of the combinations of the serial number of each software package 21 and its related protection subroutine reference code. The information 22 is stored in a secure computer 23 controlled by the software validation center 14.

The ESD manufacturer 15 assigns a characteristic serial number 24 to each ESD 25 manufactured by it. A plurality of the serialized ESDs 26 are furnished to the dealer 12 which also receives a plurality of the serialized protected software packages 21 from the software source.

The user 13 purchases a particular protected software package 27 from the dealer 12. In the same or unrelated transaction the user 13 will procure a specific serialized ESD 28 which is configured to be connected to the user's host computer 29.

The user 13 furnishes information 31 to the software validation center 14 consisting of the combination of the software serial number and the ESD serial number. Based on this input 31, the secure computer 23 generates a validation code 32 which is furnished to the user 13.

During the execution of the validation program shipped with the protected software package 27 by the host computer 29, the validation code 32 is sent to the ESD. The ESD descrambles or unencrypts the validation code and performs two functions:

(a) Checks the unscrambled validation code and looks to see if the serial number of the ESD is contained in the validation code. If the ESD validation code is not present the validation attempt is aborted by the ESD.

(b) If the ESD serial number is present, the ESD will imbed the serial number of the protected software package contained in the unscrambled validation code into the internal memory of the ESD.

During the execution of the protection subroutine by the host computer an identifier code is generated containing all or part of the following:

(a) protected software serial number,
(b) random number sequences.

This identifier code is transmitted by the host computer to the ESD. Based on the incoming identifier code and the results of the previous validation identifier code provided to the ESD at the time of validation of the protected software package, the ESD generates an identifier signal which is transmitted via the host computer to the protection subroutine. If the identifier code received from the ESD is as predicted by the protection subroutine, and only if this is true, the protection subroutine of the software package will cause the host computer to execute the protected software package.

As indicated by the dashed line 33, marketing information can be furnished to the software validation center 14, either directly by the user 13 (as part of the information input 31) or by the dealer 12 in a separate information input 34. The marketing information can be accumulated by the software validation center 14 and transmitted as periodic marketing reports 35 to the software source 11.

As will be appreciated by those skilled in the art, it would be possible to combine the functions depicted in FIG. 1 of the software validation center and the dealer such that a single entity performs both functions.

The ESD may take a wide variety of forms. Each ESD uniquely characterizes a particular customer such that, after the ESD is validated by the secure computer, the protected software package or packages can then be executed by, but only by, a host computer in communication with that particular ESD and the protected software package cannot be executed by an unauthorized third party. For example:

A. A micro chip with built-in instructions for returning an individual serial number or other unique identifier for that chip;

B. A chip or other hardware component which is configured to be unique to the authorized hardware in any way, such as a ROM, PROM, EPROM, EEPROM, with a unique number or other identifying information accessible by the communications software;

C. A flaw or error map on a hard disc that records the flaws or errors on that particular disc;

D. Any imposed identifier for the authorized hardware that is software-accessible, such as a replacement for an existing chip in a computer that would not only perform the previous function, but also provide a unique identifier;

E. A peripheral device usable for identification such as a fingerprint reader, optical retina scanning device, voice analyzer, footfall analyzer, or the like;

F. A transportable media such as a flexible, hard or optical diskette manufactured with a unique physical identifier such as lazer holes.

Other modifications and variations of the invention will occur to those skilled in the art having regard for the foregoing disclosure. Such modifications and variations are intended to be included in the scope of this invention which is limited only by the appended claims interpreted in the light of the specification and drawing and the scope and content of the prior art.

Having described my invention in such terms as to enable those skilled in the art to understand and practice it and, having identified the presently preferred embodiments thereof, I claim:

1. A central control system for protecting computer software, comprising:
   (A) a protected software package, including
      (1) a software unit having an ascertainable serial number,
      (2) a protection subroutine having a unique reference code, including
         (a) means for establishing communication with an ESD,
         (b) means for generating ESD interrogation signals, and
         (c) means for causing completion of execution of said protected software by a host computer in communication with said ESD only if said protection subroutine recognizes an identifier signal generated by said ESD, and
      (3) a validation program which communicates a validation code to said ESD;
   (B) an ESD having an ascertainable identification number electronically connected to said software package, including
      means for generating identifier signals in response to said interrogation signals;
   (C) a secure computer having a working memory electronically connected to said host computer containing
      (1) said software serial number and the corresponding unique reference code, and
      (2) means for generating said validation code in response to inputs of said software serial number and said ESD identifier; and
   (D) communication means electronically interconnecting said secure computer, said ESD and said protected software package for transmiting said validation code to said protected software package.

* * * * *